Patented June 14, 1938

2,120,667

UNITED STATES PATENT OFFICE 2,120,667

THERAPEUTIC AGENT FOR USE IN THE TREATMENT OF INFECTION

Benjamin Gruskin, Philadelphia, Pa., assignor to Lakeland Foundation, Chicago, Ill., a corporation of Illinois No Drawing. Application December 1, 1937, Serial No. 177,414

15 Claims. (Cl. 167—65)

My invention relates to an agent or substance for the therapeutic treatment of infections of the blood stream, infected parts, and for open cuts and wounds.

One of the objects of my invention is to provide an agent or substance together with the process of making the same which may be applied directly to infected parts or applied intravenously to the blood stream which agent has no deleterious effect upon the cells of the body nor upon the blood stream and which will eliminate bacteria in the sense of causing the cells of the body to resist the bacteria and/or their enzymes whereby the bacteria are weakened and caused to mutate.

Another object of my invention is to provide a substance which can be used in the therapeutic treatment of infected tissue areas and blood stream, which will selectively hinder the normal life processes of bacterial matter without adversely affecting healthy tissue.

Another object of my invention is to provide an agent or substance in such a form as to provide a means for stimulating tissue cells present in an infected part or in the infected blood stream and which will prevent the bacteria from further entering the cells and permit the normal formation of healthy granulation tissue.

Another object of my invention is to provide a non-poisonous agent for treating infected tissue areas or the blood stream either by direct or intravenous application.

Another object of my invention is to provide an iso-tonic cell stimulant which may be brought in contact with a bacterial infected area whereby to increase the resistance of the tissue and cause the bacteria to become attenuated, affording the infected tissue an opportunity to form a protective granulation.

Another object of my invention is to provide a method for the treatment of infected tissue without interfering with the physiological life of the tissue cells which consists in introducing a novel cell stimulant or bacteriostat of iso-tonic nature, which cell stimulant will cause the tissue to resist the normal life processes of the bacteria, thereby allowing the tissue cells to granulate and heal.

Numerous other objects and advantages will more fully appear during the course and progress of the following specification.

Bacteria are recognized as vegetable organisms. Infectious conditions in animal tissue normally are the result of the entrance of bacteria into such a tissue area where they begin to enter the protein matter there present, liberating an enzyme which may attack the cytoplasm of the cells to form an albuminate thereof. This action, namely, the entrance of the bacteria and/or its enzyme into the cell produces a general deterioration which characterizes the onslaught of infections disease conditions.

In accordance with the present invention there are employed compounds known as chlorophyllins or chlorophyllin salts. These are water soluble chlorophyll compounds which may be prepared by rendering chlorophyll soluble. Various methods of procedure have been proposed for rendering chlorophyll water soluble. According to one method of procedure, as given by Willstatter and Stohl (Investigations on Chlorophyll), an alkali is permitted to act upon chlorophyll pigment. If certain metal salts are present during the reaction, these enter into combination to form chlorophyllin salts of the metal. Whereas, the original chlorophyll pigment is water insoluble, chlorophyllins are readily soluble in water and may be employed in accordance with the invention in the manner to be hereinafter described. It must be remembered in this connection that the chemistry of the compounds is of considerable complexity and has not been completely investigated.

I have discovered that water soluble chlorophyll, present locally in an infected area and in a suitable form, will cause the gradual attenuation of the bacteria there present until they finally leave the area. At the same time the formation of granulation tissue will be enhanced with the result that healing will take place rapidly. Thus it has been observed that infectious bacteria in the presence of the dissolved chlorophyllin and in contact with the cells of a host gradually assume a changed form, becoming less vigorous and progressively mutating. Because of this fact the cells of the host immediately resume their normal functions and form granulation tissue which pushes out the bacteria and acts as a protective barrier against further attack. This case is a continuation in part of my co-pending application, Serial No. 39,732, filed September 9, 1935.

It is conceived that this action is due to the stimulating effect of the water soluble chlorophyllin upon the tissue cells. In the usual infected areas, as aforementioned, the bacteria release an enzyme to digest the cell wall membrane, permitting a reaction with the cytoplasm interiorly thereof, forming an albuminate which gives the characteristic symptoms inherent in each type of organism. On the other hand, when water soluble chlorophyllin in suitable form is present in the vicinity of the cell, the cell and/or the cell wall is stimulated in such a manner as to resist entrance of the enzyme. Accordingly the cytoplasm is protected from the destructive action of the enzyme and the cell, therefore, remains relatively normal and healthy as compared with cells which have been destroyed by the usual bacterial processes. Since the bacteria do not lead their normal biological existence, namely, the assimilation and destruction of tissue cells, they gradually become attenuated while at the same time the tissue cells granulate and commence to fill the existing wound with new and healthy tissue.

The chlorophyll tissue stimulant preparation employed must be dissolved in an aqueous medium. The medium furthermore should be "passive" or of a character not deleterious to the tissue or animal organism into contact with which the medium may come. One suitable passive medium is, for instance, the physiological salt solution commonly known in the medical profession as saline solution, although various substantially iso-tonic or bland preparations are usable, depending in some measure upon the particular location and nature of the infection to be treated. Thus, when the water soluble chlorophyll is properly dissolved in a suitable passive carrier containing water, it is possible to provide a new and extremely effective composition for stimulating cells against the invasion of infectious bacteria.

In preparing the cell or tissue stimulating compositions in accordance with the present invention, a number of different passive media have been found to be suitable as solvents or carriers for the composition. By selection of appropriate carriers, the preparation may be made either in the form of a liquid, salve, or a relatively viscous preparation.

Thus, where it is inconvenient or impossible to maintain a very fluid preparation in contact with the infected area, a salve may be employed, while, for application to the mucous membranes of the throat, for instance, a very tenacious and viscous preparation may be indicated. For intravenous injection the physiological salt solution may be preferably employed as the carrying medium and solvent. A preparation of the last named type may be made as follows: Two grams of water soluble chlorophyll of the type known technically as sodium magnesium chlorophyllin is ground to a powder, and then added to one liter of distilled water and permitted to dissolve. The solution is filtered once through filter paper, using a Buchner funnel and suction. After filtration 8.5 grams of sodium chloride are dissolved in the solution which is then filtered three times through filter paper in the same manner as before and then autoclaved twenty minutes at 18-20 pounds until sterile, whereupon it is ready for immediate use.

In accordance with the present invention, the results are equally suitable when the water soluble chlorophyll is dissolved in the proportion of either 1 or 2 or more grams of the chlorophyll to a liter of saline solution. Solutions of considerably increased concentration have likewise been found to cause the mutation of bacteria in an infected area. For example, 1 gram of a suitable water soluble chlorophyll to 300 cc. of physiological salt solution, and even 1 gram of chlorophyll to only 100 cc. of aqueous solvent has produced valuable results. It is the purpose of the invention, however, not to employ such a concentration of solute as will tend to irritate the tissue. Accordingly the preferred concentration comprises in the neighborhood of ½ to 2 grams of chlorophyll per liter of salt solution.

In place of the particular water soluble chlorophyll disclosed, there may be employed in the above example, the modifications known technically as sodium copper chlorophyllin or sodium iron chlorophyllin.

For use with sinus infections it has been found preferable to employ the following preparation: A solution is made up containing hydrochloric acid dissolved in distilled water in the ratio of one part hydrochloric acid to ten thousand parts of distilled water. This solution is filtered and to one liter thereof there is added two grams of sodium magnesium chlorophyllin. After this is completely dissolved, the solution is filtered and there is added thereto sufficient salt to render it iso-tonic. The solution is repeatedly filtered and then autoclaved as described in connection with the previous example.

As hereinbefore mentioned, various other media may be employed instead of physiological salt solution. A salve may be prepared as follows: Two tenths of a gram of the grade of water soluble chlorophyll known technically as sodium magnesium chlorophyllin, which has been finely ground, is rubbed into 100 grams of lanolin uniformly mixed and distributed therein. The preparation is then placed in covered jars and autoclaved until sterile. When cool, the preparation is ready for use.

In place of the lanolin many iso-tonic unguents may be employed, such, for example, as lard, petrolatum, and aquaphor (mainly eucerin, which comprises a mixture of esters of iso- and oxy-cholesterol alcohols with principally the following acids:—oleic, carnaubic, and mysternic). Attention is directed to the fact that lanolin contains a known portion of water which accounts for the solubility of the water soluble chlorophyll therein. In each of the unguent preparations there must be present, in substantial homogeneous admixture, a proportion of water in some suitable form to act as a solvent.

A suitable viscous and tenacious preparation for application to throat infections, for instance, and which will tend to adhere to the mucous membranes, may be made in the following manner: First, a solution of pectin in distilled water is made up in the proportion of one part of pectin to ten thousand parts of water. Chlorophyll powder of the type known technically as sodium iron chlorophyllin is powdered and then dissolved in this solution in the proportion of preferably 1 gram of chlorophyll to 100 cc. of solution. Preparations may be made, on the other hand, by dissolving the water soluble chlorophyll in the ratio of 1 gram of chlorophyll to 200 or, alternatively, 300, 400 and 500 cc. of the pectin solution as desired. After the chlorophyll powder has been thoroughly dissolved, there is added sufficient C. P. sodium chloride so that the solution contains 8.5 grams of sodium chloride per liter. The sodium chloride is completely dissolved and the solution filtered three times through a Buchner funnel using a No. 1 grade of Whatman filter paper. After filtering, the solution is placed in covered flasks and autoclaved until sterile.

In place of pectin, various other gel or gum-forming substances may be substituted. For example, gum-tragacanth and gum-arabic may alternatively be incorporated in the composition to give the required degree of viscosity and adhesiveness.

The following preparation has been found suitable for use in the treatment of osteomyelitis and other bone infections: A ½ percent solution of starch is made up by dissolving 5 grams of water soluble starch in one liter of water, the mixture being warmed to promote solution. After solution is complete, the liquid is filtered and cooled. A solution of lactic acid is made up in a dilution of one part lactic acid to ten thousand parts distilled water. To each liter of starch solution there is added 250 cc. of the above solution of lactic acid. After this has been filtered again, 2.5 grams of the powdered soluble chlorophyll is added and dissolved as above, after which the preparation is made substantially iso-tonic by adding salt in the proportion of 8.5 grams per liter, and is filtered and autoclaved. This preparation tends to remain in contact with the site of the infection so as to maintain the water soluble chlorophyll in contact with cells subject to attack by the invading bacteria.

It is to be noted that the above described preparations are all iso-tonic or substantially iso-tonic in character, and accordingly they have no deleterious action upon the healthy cells.

The chlorophyll preparations are employed generally by situating them in direct contact with the infected area. In the treatment of open discharging wounds or in cases where sinuses are formed, the chlorophyll preparations may be applied in Dakin's tubes or in the form of dressings wet with chlorophyll solution. Effort is made to maintain fresh chlorophyll solution continually in the region of the infected area for relatively long periods at a time. For instance, the wet dressing treatment or other treatment may be applied twice daily, although no deleterious effect has been noted when the present solutions are applied continually.

In treating nasal sinus infections and colds, tampons of cotton are immersed in a chlorophyll solution, preferably one of the aforementioned saline solution preparations, and placed in the nose as high as possible. The tampons are allowed to remain in position in substantially direct contact with the infected area for at least an hour, after which they are removed. In treatments of this kind it has been observed that removal of the tampons is followed by a profuse discharge. This treatment repeated once or twice daily has been found to relieve not only acute and chronic nasal sinus infections, but also acute and chronic rhinitis and other similar infectious conditions. In order to get the best results, application of the saturated tampons to the infected areas should be repeated at least daily and it has been found that in the majority of cases acute rhinitis is completely cured by two such treatments. In using a catheter a sufficient quantity of chlorophyll solution is poured directly into the infected area and retained for at least an hour at a time or longer, if feasible.

In bacteriemia, an iso-tonic solution prepared in accordance with the present invention may be intravenously injected into the patient. It has been found that from 50 cc. to 80 cc. provide a satisfactory dosage and that the injection into the patient is preferably made every other day until cure is noted. Injections may be made daily, if necessary. Two to eight injections, according to the clinical study, are usually sufficient to cause the infectious bacteria to disappear from the blood stream. It will be apparent that the quantity of the dosage, as well as the frequency of the treatment may be varied widely in accordance with the particular patient and the preference of the attending physician. The relatively viscous preparations such, for instance, as the pectin chlorophyll composition is particularly useful in throat infections and similar situations. It is applied locally by being swabbed upon the particular area and is maintained in position for a period of time due to its tenacity and jelly-like consistency.

On the other hand, the chlorophyll unguent preparations hereinbefore defined may be spread across the infected area. In the case of readily accessible infections, the use of the lanolin chlorophyll preparation, for instance, is considerably more convenient and less troublesome than the application of wet dressings containing the chlorophyll saline solution. Since all of these compositons appear substantially equally as effective in combating infection, selection thereof will generally be dictated by convenience and application for use. In clinical use, ear infections wherein a chronic discharge has persisted, have been effectually treated merely by having the patient lie on the opposite side for half an hour to an hour while chlorophyll was injected into the ear canal by an ordinary medicine dropper.

The present chlorophyll preparations have been successfully employed in the treatment of many types of infections including osteomyelitis of staphylococcic origin, empyema of the lung of pneumococcic origin, periephritic infections with the colon bacillus, peritonitis of streptococcic origin, sinus infections and streptococcic bacteriemia, as well as ordinary infections producing head colds.

It is thought that the invention and numerous of its attendant advantages will be understood from the foregoing description and it is obvious that numerous changes may be made in the process without departing from the spirit or scope of the invention, or sacrificing any of its attendant advantages, the form herein described being a preferred embodiment for the purpose of illustrating the invention.

Having thus described my invention, what I claim as new and desire to secure by Letters Patent is as follows:

1. A cell stimulating composition for use in the treatment of infections comprising a water soluble chlorophyllin dissolved in an aqueous carrier.

2. A cell stimulating composition for use in the treatment of infections comprising a water soluble chlorophyll dissolved in a physiological salt solution.

3. A cell stimulating composition for use in the treatment of infections comprising a water soluble chlorophyllin dissolved in a substantially iso-tonic carrier.

4. A cell stimulating composition for use in the treatment of infections comprising a water soluble chlorophyllin dissolved in a salt solution.

5. A cell stimulating composition for use in the treatment of infections comprising a water soluble chlorophyllin dissolved in a physiological salt solution.

6. A cell stimulating agent for use in the treatment of infections comprising a water soluble chlorophyll dissolved in an aqueous phase and supported by a carrier of substantially non-deleterious character.

7. A cell stimulating agent for use in the treatment of infections comprising a chlorophyll which has been rendered water soluble by treatment with an alkali dissolved in a substantially iso-tonic medium comprising water.

8. A cell stimulating agent for use in the treatment of infections comprising a chlorophyll which has been rendered soluble in water by treatment with an alkali in the presence of a metal salt, said chlorophyll compound being dissolved in a substantially iso-tonic medium.

9. A cell stimulating agent for use in the treatment of pyogenic infections comprising a sodium magnesium chlorophyllin and a substantially iso-tonic carrier therefor, the carrier containing water in which at least a part of the chlorophyllin is dissolved.

10. A cell stimulating agent for use in the treatment of pyogenic infections comprising a sodium copper chlorophyllin and a substantially iso-tonic carrier therefor, the carrier containing water in which at least a part of the chlorophyllin is dissolved.

11. A cell stimulating agent for use in the treatment of pyogenic infections comprising a sodium iron chlorophyllin and a substantially iso-tonic carrier therefor, the carrier containing water in which at least a part of the chlorophyllin is dissolved.

12. A cell stimulating agent for use in the treatment of infections of the type of osteomyelitis comprising a water soluble chlorophyll dissolved in an aqueous solution, said solution containing also soluble starch and lactic acid, and providing a preparation for maintaining the soluble chlorophyll in contact with the infected area.

13. A cell stimulating agent for use in the treatment of infections of the type of osteomyelitis and bone infections comprising a water soluble chlorophyll dissolved in an aqueous solution, said solution containing also a starch and lactic acid, and providing a preparation of the proper characteristics for maintaining the soluble chlorophyll in contact with the infected area.

14. A cell stimulating agent for use in the treatment of infections comprising a water soluble chlorophyll dissolved in a carrier comprising lanolin.

15. A cell stimulating agent for use in the treatment of infections comprising a water soluble chlorophyll dissolved in an aqueous carrier comprising pectin.

BENJAMIN GRUSKIN.